United States Patent
Sakatani et al.

(10) Patent No.: US 10,377,637 B2
(45) Date of Patent: Aug. 13, 2019

(54) AEROGEL AND MANUFACTURING METHOD THEREOF

(71) Applicant: Panasonic Intellectual Property Management Co., Ltd., Osaka (JP)

(72) Inventors: Shigeaki Sakatani, Osaka (JP); Kazuma Oikawa, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 35 days.

(21) Appl. No.: 15/327,839

(22) PCT Filed: Nov. 5, 2015

(86) PCT No.: PCT/JP2015/005546
§ 371 (c)(1),
(2) Date: Jan. 20, 2017

(87) PCT Pub. No.: WO2016/075906
PCT Pub. Date: May 19, 2016

(65) Prior Publication Data
US 2017/0203971 A1    Jul. 20, 2017

(30) Foreign Application Priority Data
Nov. 11, 2014   (JP) .................... 2014-228835

(51) Int. Cl.
*C01B 33/16*   (2006.01)
*F28F 13/00*   (2006.01)
(Continued)

(52) U.S. Cl.
CPC ............ *C01B 33/16* (2013.01); *C01B 33/159* (2013.01); *C01B 33/1585* (2013.01);
(Continued)

(58) Field of Classification Search
CPC ... C01B 33/1585; C01B 33/159; C01B 33/16; C01B 33/155; F28F 13/00
See application file for complete search history.

(56) References Cited

U.S. PATENT DOCUMENTS 3,977,993 A * 8/1976 Lynch ................ B01J 13/0091
423/338
4,279,879 A   7/1981 Winyall et al.
(Continued)

FOREIGN PATENT DOCUMENTS

CN  102642842 A  8/2012
CN  102642842 B  10/2013
(Continued)

OTHER PUBLICATIONS

Boday et al., "Mechanically reinforced silica aerogel nanocomposites via surface initiated atom transfer radical polymerizations," J. Mater. Chem, 2010, 20, 6863-6865.*
(Continued)

*Primary Examiner* — Anthony J Zimmer
(74) *Attorney, Agent, or Firm* — Panasonic IP Management; Kerry S. Culpepper

(57) ABSTRACT

In a method for manufacturing an aerogel, an acid is added to a first aqueous high-molar-ratio silicate solution that includes silica particles having a mean particle diameter of from 1 nm to 10 nm and that is alkaline, to produce a gel. The gel is subjected to a dehydration condensation to obtain a hydrogel. The hydrogel is converted into a hydrophobized gel. Then, the hydrophobized gel is dried. According to the method, an aerogel having a pore volume of from 3.00 cc/g to 10 cc/g, a mean pore diameter of from 10 nm to 68 nm, and a specific surface area of from 200 $m^2/g$ to 475 $m^2/g$ can be prepared.

5 Claims, 3 Drawing Sheets

(51) Int. Cl.
*C01B 33/158* (2006.01)
*C01B 33/159* (2006.01)

(52) U.S. Cl.
CPC .......... *F28F 13/00* (2013.01); *C01P 2006/12* (2013.01); *C01P 2006/14* (2013.01); *C01P 2006/16* (2013.01)

(56) References Cited

U.S. PATENT DOCUMENTS

| | | | |
|---|---|---|---|
| 4,387,008 A | | 6/1983 | Winyall et al. |
| 5,795,556 A | | 8/1998 | Jansen et al. |
| 5,807,501 A | | 9/1998 | Burns et al. |
| 6,005,012 A | * | 12/1999 | Hrubesh .............. C01B 33/159 106/287.12 |
| 2001/0034375 A1 | | 10/2001 | Schwertfeger et al. |
| 2003/0151173 A1 | | 8/2003 | Wang et al. |
| 2007/0289974 A1 | * | 12/2007 | Blair .................... F17C 13/001 220/560.15 |
| 2009/0104401 A1 | | 4/2009 | Nakanishi et al. |
| 2009/0317619 A1 | * | 12/2009 | Di Monte ............. C01B 13/36 428/315.7 |
| 2011/0206471 A1 | * | 8/2011 | Doshi .................. C04B 14/064 408/1 R |
| 2012/0064345 A1 | * | 3/2012 | Gini .................... C01B 33/1546 428/402 |
| 2012/0134909 A1 | * | 5/2012 | Leventis .............. B82Y 30/00 423/439 |
| 2013/0189521 A1 | | 7/2013 | Fukuju et al. |
| 2015/0141544 A1 | * | 5/2015 | Meador ............... C08G 73/101 521/183 |
| 2015/0360961 A1 | | 12/2015 | Oikawa et al. |

FOREIGN PATENT DOCUMENTS

| | | |
|---|---|---|
| JP | 56-054220 | 5/1981 |
| JP | 11-005716 | 1/1999 |
| JP | 2001-504756 | 4/2001 |
| JP | 2001-513065 | 8/2001 |
| JP | 2004-203642 | 7/2004 |
| JP | 3854645 B | 12/2006 |
| JP | 2012-091943 | 5/2012 |
| WO | 2007/010949 | 1/2007 |
| WO | 2008/077876 A1 | 7/2008 |
| WO | 2012/057086 | 5/2012 |

OTHER PUBLICATIONS

The Extended European Search Report dated Oct. 17, 2017 for the related European Patent Application No. 15858787.3.
International Search Report of PCT application No. PCT/JP2015/005546 dated Dec. 8, 2015.
J. P. Nayak et al., "Preparation of Silica Aerogel by Ambient Pressure Drying Process using Rice Husk Ash as Raw Material", Transactions of the Indian Ceramic Society, 2009, vol. 68, No. 2, p. 91-94.
English Translation of Chinese Search Report dated May 3, 2018 for the related Chinese Patent Application No. 201580043751.4.

* cited by examiner

AEROGEL AND MANUFACTURING METHOD THEREOF

CROSS-REFERENCE TO RELATED APPLICATIONS

This application is a U.S. national stage application of the PCT International Application PCT/JP2015/005546 filed on Nov. 5, 2015, which claims the benefit of foreign priority of Japanese patent application No. 2014-228835 filed on Nov. 11, 2014, the contents all of which are incorporated herein by reference.

TECHNICAL FIELD

The technical field relates to an aerogel and a production method thereof.

BACKGROUND ART

Recently, new heat-insulation materials for energy saving have been sought. There are heat-insulation materials called aerogels in which silica particles are connected with one another. The silica aerogels are quite different from urethane foams (PUs) and expanded polystyrene (EPS) that are versatile heat-insulation materials, or vacuum insulated panels (VIPs). There are almost no changes in heat-insulation performance of silica aerogels across the ages. Furthermore, silica aerogels have heat resistance of 400° C. or higher. For these reasons, silica aerogels have attracted a great deal of attention as next-generation heat-insulation materials.

PUs and EPS have problems of deterioration of heat-insulation performance due to extraction of gases over time, and poor heat resistance. VIPs have excellent heat-insulation performance of several milliWatts per milliKelvin. However, VIPs have problems such as aged deterioration resulting in loss of vacuum, and low heat resistance of only about 100° C.

Silica aerogels are superior to any other existing heat-insulation materials in terms of deterioration with age and heat resistance. Silica aerogels have excellent heat conductivities of around 15 mW/mK. However, silica aerogels have network structures in which silica particles on the scale of several tens of nanometers are connected in rows through point contact. Accordingly, silica aerogels do not have sufficient mechanical strength. Therefore, in order to overcome the weakness, studies have been made on methods for improving the strength by way of combining silica aerogels with fibers, unwoven fabrics, resins, etc.

In general, inorganic nanoporous materials such as silica aerogels are synthesized by a sol-gel method that is based on a liquid-phase reaction. Water glass (an aqueous solution of sodium silicate) or alkoxysilane compounds such as tetramethoxysilane are used as raw materials. These materials, and a liquid medium such as water or alcohols, and a catalyst, as needed, are mixed, and the materials are hydrolyzed. That is, the sol materials are subjected to a polycondensation in the liquid medium to convert the sol materials into a gel.

Then, the gel is caused to grow. This step is called aging. Aging is a step for causing the polycondensation reaction of the gel to proceed, thus reinforcing the skeletons.

Then, a silylation step is carried out. In this step, the gel is hydrophobized with a silylating agent. In cases where hydrophobization treatments are not carried out, contraction of gel skeletons due to strong capillary force will occur when the liquid medium in the gel is evaporated to dry the gel. Consequently, silica particles come into physical contact with each other, a dehydration condensation of silanols present on the surfaces of silica particles proceeds, and contraction and densification are induced. As a result, aerogels having inferior heat-insulation performance will be produced.

On the other hand, in cases where a hydrophobization treatment is carried out, silanols present on surfaces of silica particles in the gel sufficiently react with the silylating agent, and thus, the hydroxyl groups are capped. For this reason, even if the gel skeleton temporarily contracts due to the capillary force when the liquid medium inside the gel is evaporated to dry the gel, the contraction will be alleviated since any silanols are not present. As a result, contraction and densification of the aerogel will be suppressed, and thus, an aerogel having excellent heat-insulation performance will be produced.

This phenomenon is called springback. That is, the hydrophobization step is indispensable in order to cause this springback. In addition, it is very important to optimize an amount of a silylating agent included therein, a reaction system, temperature, time, etc. in the hydrophobization step.

Finally, the liquid medium inside the gel is evaporated to dry the gel. For a drying technique therefor, the supercritical drying method or non-supercritical drying method (ordinary-pressure drying methods, freeze-drying methods, etc.) can be used. The above-described synthesis is disclosed in WO/2007/010949, Japanese Patent No. 3,854,645, etc.

SUMMARY

The disclosure realizes an aerogel that has high strength and high heat-insulation performance. That is, the disclosure makes it possible to produce a gel having a large specific surface area in a short time even without using a large amount of a silylating agent.

In the method for manufacturing an aerogel according to the disclosure, an acid is added to a first aqueous high-molar-ratio silicate solution that includes silica particles having a mean particle diameter of from 1 nm to 10 nm and that is alkaline, to produce a gel. The gel is subjected to a dehydration condensation to obtain a hydrogel. The hydrogel is converted into a hydrophobized gel. Then, the hydrophobized gel is dried.

The above production method makes it possible to develop silica secondary particles having flat and smooth surfaces, and to reduce the number of unreacted silanols that may exist on surfaces of the silica secondary particles. This further makes it possible to reduce an amount of a hydrophobizing agent and to shorten the reaction time. The resulting product aerogel will have a pore volume of from 3.00 cc/g to 10 cc/g, a mean pore diameter of from 10 nm to 68 nm, and a specific surface area of from 200 $m^2/g$ to 475 $m^2/g$. The aerogel has higher strength compared with general aerogels, and therefore, even when the aerogel produced by the disclosure is supported on an unwoven fabric, and the unwoven fabric is formed into a sheet with a thickness of 1 nm or less, the aerogel rarely fractures and crumbles.

The aerogel synthesized by means of the disclosure can be a heat-insulation material or sound-absorbing material having excellent strength, and therefore, have higher industrial usefulness, compared with aerogels produced by conventional synthesis methods.

According to the disclosure, a dehydration/condensation reaction is conducted at appropriate silicate concentrations, aging temperatures, and aging time by using an alkaline and high-molar-ratio first aqueous silicate solution as a material for an aerogel, and thus, an aerogel having high strength and high heat-insulation performance can be synthesized.

DESCRIPTION OF EMBODIMENTS

Figure 1:
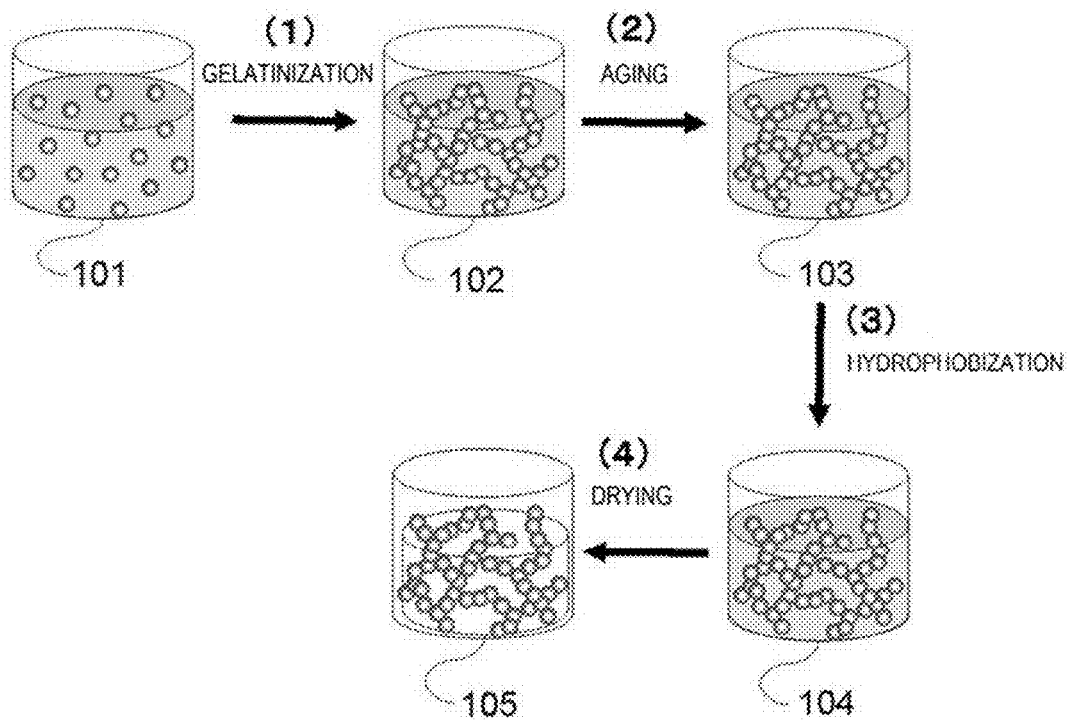
FIG. 1 is a diagram that illustrates a method for manufacturing an aerogel according to an embodiment.

Prior to description of embodiments of the disclosure, problems in conventional arts will be described in brief. Gels prepared by conventional arts have low strength and low heat-insulation performance. If a large amount of a silylating agent is used, the strength and the heat-insulation performance will be improved. However, in that case, the costs and the production time will be increased.

Hereinafter, embodiments of the disclosure will be described by showing examples.

An aerogel in this embodiment is a dehydrated condensate that is produced by adding an acid serving as a pH adjusting agent to an alkaline aqueous silicate solution (high-molar-ratio first aqueous silicate solution) including 10% to 20% of silica. Additionally, in some instances, an amount of the acid added thereto may be increased, and, after the pH is adjusted to 7 or lower, an alkali may be added thereto to cause the dehydration/condensation reaction under near-neutral conditions. In addition, the silicate concentration is based on percent by weight.

The aerogel produced in the production method according to the embodiment has a mean pore diameter of from 10 nm to 68 nm, a pore volume of from 3.0 cc/g to 10 cc/g, and a specific surface area of from 200 $m^2/g$ to 475 $m^2/g$.

If the mean pore diameter is smaller than 10 nm, the density of the solid will excessively increase, and therefore, the heat conductivity will increase, and the heat-insulation performance will be deteriorated. On the other hand, if the mean pore diameter is larger than 68 nm, then, a convection component of the air will be intolerable since the mean free path of the air is 68 nm. Accordingly, the heat conductivity will increase, while the heat-insulation performance will be deteriorated.

The pore volume is preferably from 3.0 cc/g to 10 cc/g. If the pore volume is smaller than 3 cc/g, the foaming rate will be low, and thus, the resulting aerogel will not be able to deliver sufficient performance as a heat-insulation material. On the other hand, if the pore volume exceeds 10 cc/g, then, the mechanical strength will significantly be lowered, severe powder falling would occur, and the reliability would be lowered due to deterioration with age.

Also, if the specific surface area is smaller than 200 $m^2/g$, the resulting aerogel will not be able to deliver sufficient heat-insulation performance. If the specific surface area exceeds 475 $m^2/g$, fragility would be increased, and therefore, the reliability would be deteriorated due to deterioration with age, in particular, in form of a sheet.

If the mean pore diameter and the pore volume of the aerogel are within the above mentioned ranges, the aerogel has excellent heat-insulation properties, and therefore, is suitable as a heat-insulation material or sound-absorbing material. Furthermore, when the specific surface area is within the above range, only a small amount of the silylating agent used for hydrophobization is required, and the reaction will be completed in a short time.

Furthermore, the gel obtained in this embodiment has higher strength compared with conventional gels. Production of aerogels having the above physical properties could be possible after the production method described blow is carried out.

The mean pore diameter and the pore volume of the aerogel can easily be controlled by adjusting a silicate concentration of water glass that serves as a raw material, a type and a concentration of an acid used for sol formation, conditions for converting the sol to a gel (temperature, time, etc.), an amount of a silylating agent, an amount of a solvent, temperature, and time as hydrophobization conditions, etc.

In addition, values of the mean pore diameter and the pore volume of the aerogel in present embodiments refer to values obtained by measurements based on the nitrogen adsorption method.

(Overview of the Production Method as a Whole)

The aerogel and the method for manufacturing the same according to this embodiment will now be described. At first, steps for manufacturing the aerogel in this embodiment will be shown. The described conditions are merely examples, and actual conditions are not limited to the described conditions.

FIG. 1 shows one example of production conditions for steps of preparation to drying of sol 101.

In the sol-preparation step (1), a sol 101 of an aqueous alkaline silicate solution is converted into a gel to prepare a hydrogel 102. At first, an alkaline high-molar-ratio first aqueous silicate solution including 10% to 20% of $SiO_2$, and 1% or less of $Na_2O$ is prepared from an alkaline low-molar-ratio second aqueous silicate solution with a $SiO_2/Na_2O$ ratio (molar ratio) of about 0.5 to 4. Then, the first aqueous silicate solution is converted to a gel. Hereinafter, molar ratios refer to molar ratios of $SiO_2/Na_2O$. Additionally, a blending ratio of $SiO_2/Na_2O$ is based on percent by weight.

Then, hydrochloric acid is added to the first aqueous silicate solution. While the resulting solution is stirred, the pH thereof is adjusted to 7.0 to 7.5. This causes conversion of the sol 101 into a gel. The first aqueous silicate solution will be converted into a gel at room temperature in about five minutes, and thus, a hydrogel 102 is produced.

In the aging step (2), a skeleton of silica is reinforced after gelatinization. That is, the hydrogel 102 is heated in a furnace at 80° C. for 12 hours to reinforce the skeleton of the hydrogel, and thus, a hydrogel 103 with a reinforced skeleton is prepared.

In the hydrophobization step (3), a surface of the aerogel is hydrophobized in order to prevent contraction of the aerogel during the drying step. That is, the hydrogel 103 with a reinforced skeleton is mixed with an active species (trimethylsilyl chloride in this embodiment) in a mixture solution of hexamethyldisiloxane (HMDSO), hydrochloric acid, and 2-propanol. The mixture solution is reacted in a furnace at 55° C. for 12 hours, thereby preparing a surface-modified gel 104.

In the drying step (4), the surface-modified gel 104 (having a surface modified with a trimethylsilyl group in this embodiment) is dried in a furnace at 150° C. for 2 hours, thereby preparing an aerogel 105.

(Details on Production)

(1) Gelatinization Step

In the gelatinization step, the sol 101 that has been obtained by adding an acid to the alkaline high-molar-ratio first aqueous silicate solution is subjected to a polycondensation (gelatinization), thereby making the hydrogel 102

The first aqueous silicate solution is produced from water glass. Water glass refers to an aqueous sodium silicate solution or an aqueous silicate soda solution, and is a liquid formed by dissolution of $SiO_2$ (silica) and $Na_2O$ (sodium oxide) in $H_2O$ at various ratios. A molecular formula of water glass is $Na_2O.nSiO_2.mH_2O$ in which n refers to a molar ratio representing a mixing ratio of $Na_2O$ and $SiO_2$.

The first aqueous silicate solution is an aqueous silicate solution that has a large value of the above-mentioned molar ratio (specific molar ratios will be described below) and that includes 10% or more of silica. The first aqueous silicate solution is an aqueous solution that is obtained by removing sodium, which is unnecessary for formation of aerogels, from water glass, followed by stabilization of the solution within an alkaline region. The first aqueous silicate solution is neither water glass nor colloidal silica. A particle diameter of the sol in the first aqueous silicate solution falls within an intermediate-size range (1-10 nm) between sizes of water glass and colloidal silica.

If an aqueous silicate solution with a sol particle diameter smaller than 1 nm is used, simultaneous pursuit of the above-mentioned small pore diameter and specific surface area becomes difficult, as shown above. Therefore, consequently, only fragile and breakable aerogels are synthesized. If silica with a sol particle diameter larger than 10 nm is used, the reactivity is lowered, and therefore, a homogenous gel cannot be formed.

<First Aqueous Silicate Solution With a High-Molar Ratio>

With regard to a method for manufacturing the first aqueous silicate solution, the first aqueous silicate solution can be produced at least by the following steps using a second aqueous silicate solution that has a molar ratio lower than the first aqueous silicate solution and that is alkaline, as a starting material:

(a) adding an acid to the second aqueous silicate solution (an aqueous silicate solution having a silicate concentration of 10% or more) to produce a by-product salt. In this step, in cases where sodium silicate is used as the second aqueous silicate solution, and hydrochloric acid is used as the acid, the byproduct salt will be sodium chloride.

(b) immediately after above Step (a), bringing the aqueous solution into contact with a pressure-driven semipermeable membrane to concentrate the aqueous solution and to simultaneously separate and remove the by-product salt produced in above Step (a); and (C) subsequent to above Step (b), or simultaneously with above Step (b), continuously or intermittently adding water to the aqueous solution. Then, the aqueous solution is again brought into contact with the pressure-driven semipermeable membrane in above Step (b) to concentrate the aqueous solution and to simultaneously separate and remove the by-product salt produced in above Step (a). These steps are repeated to produce the first aqueous silicate solution.

In addition, a method for preparing the first aqueous silicate solution is not limited to the above-described method. However, when a general aqueous water glass solution No. 4 is caused to pass through an ion-exchange resin to remove sodium, salts are deposited on the surface of the ion-exchange resin, and therefore, removal of sodium cannot efficiently be carried out, unless the aqueous solution is diluted to less than 10%.

Hence, in this technical field, when sodium is removed from water glass that is a second aqueous alkaline low-molar-ratio-silicate solution, generally, the aqueous solution is diluted to less than 10%, and then, is converted into a gel through a dehydration-condensation reaction. Accordingly, based on such a technique, it is difficult to increase the concentration of silica to the concentration level achieved by present embodiments.

The molar ratio of $SiO_2$ to $Na_2O$ in the first silicate solution, which is used as a material in present embodiments, is preferably from 15 to 30.

A first aqueous silicate solution having a molar ratio of from 15 to 30 is advantageous in terms of shortened aging time, or improvements in strength of the gel skeleton.

Since a first aqueous silicate solution having a molar ratio of less than 15 may require a prolonged aging time, the productivity may be unfavorable, and such a first aqueous silicate solution may be unsuitable.

A first aqueous silicate solution having a molar ratio of more than 30 would exhibit high reactivity, and therefore, a stable gelatinization reaction may not be caused. As a result, it may be difficult to control a time for the gelatinization reaction.

The first aqueous silicate solution used in present embodiments preferably has a silicate concentration of from 10 wt % to 20 wt %.

If a first aqueous silicate solution having a silicate concentration of less than 10 wt % is used, the strength of the gel may be insufficient in the same manner as conventional arts since the silicate concentration is low.

If a first aqueous silicate solution having a silicate concentration of more than 20 wt % is used, a time required for gelatinization of the sol solution may drastically be shortened, and thus, it may be impossible to control the time.

<Catalyst>

In order to promote a hydrolysis reaction of silicates in the first alkaline aqueous silicate solution, an acid catalyst is preferably added to the solution.

With regard to types of acid used herein, inorganic acids such as hydrochloric acid, nitric acid, sulfuric acid, hydrofluoric acid, sulfurous acid, phosphoric acid, phosphorous acid, hypophosphorous acid, chloric acid, chlorous acid, and hypochlorous acid; acidic phosphates such as acidic aluminum phosphate, acidic magnesium phosphate, and acidic zinc phosphate; and organic acids such as acetic acid, propionic acid, oxalic acid, succinic acid, citric acid, malic acid, adipic acid, and azelaic acid, among others, can be mentioned. Although a type of an acid used herein is not limited, hydrochloric acid is preferable since the resulting silica aerogel will have sufficient strength of the gel skeleton, and sufficient hydrophobicity.

For example, a concentration of the acid is preferably from 1 N to 12 N, more preferably from 6 N to 12 N, when the acid is hydrochloric acid. If the concentration is less than 1 N, it is required to add a larger amount of diluted hydrochloric acid to the first aqueous silicate solution when the pH of the first aqueous silicate solution is adjusted to a desired value, and therefore, the silicate concentration may be decreased, and thus, development of a silica network may not effectively proceed.

An amount of the acid catalyst added to the reaction solution depends on a pH value that the reaction solution is adjusted to. However, when 12 N aqueous hydrochloric acid is used, 0.5 to 6.0 parts by weight thereof is preferably added, and, 1.0 to 3.0 parts by weight thereof is more preferably added with respect to 100 parts by weight of the hydrogel. Reductions in the silicate concentration can be suppressed, and a precise and high-strength silica network can be developed.

A sol solution that is prepared by adding the above acid catalyst to the first aqueous silicate solution is converted to a gel. Gelatinization of the sol is preferably carried out inside a closed vessel that prevents volatilization of a liquid medium.

<pH>

When an acid is added to the first aqueous silicate solution to convert it into a gel, the pH during the process is preferably from 5.0 to 8.0.

If the pH is lower than 5.0, or is higher than 8.0, the first aqueous silicate solution may not be converted into a gel although it depends on the temperature during the process.

<Temperature>

A temperature for gelatinization of the sol is preferably 0° C. to 100° C. under ordinary pressure. Although gelatinization will occur even at ordinary temperatures, the chemical reaction of gelatinization can be accelerated by heating the reaction mixture.

If the temperature is lower than 0° C., required heat will not be transmitted to silicate monomers that are active species for the reaction, and growth of silica particles will not be promoted. Accordingly, it takes some time before the gelatinization sufficiently progresses. Furthermore, the produced wet gel may have low strength, and may excessively be shrunk during the drying step. As a result, a desired aerogel cannot be obtained in most cases. In this case, the wet gel is also called a hydrogel 102, and refers to a gel that includes water. In this method, since a gel is prepared from the aqueous solution, the gel is always a wet gel (hydrogel 102).

In cases where the gelatinization temperature exceeds 100° C., a phenomenon in which water is volatilized and separated from the gel inside the vessel would be observed even if the vessel is sealed. This phenomenon causes reductions in the volume of the resulting wet gel (hydrogel 102), and thus, there may be cases where a desired aerogel 105 cannot be obtained.

<Gelatinization Time>

In addition, the gelatinization time will vary with the gelatinization temperature, and a time for aging carried out after gelatinization (described below). However, the sum of the gelatinization time and the aging time is preferably from 0.5 to 72 hours. By carrying out gelatinization and aging in this manner, a wet gel (hydrogel 102) that has improved strength and rigidity of the gel wall and that hardly shrinks during the drying step can be obtained.

When the gelatinization time is from 0.5 to 72 hours, it becomes possible to form a gel skeleton that has a strength sufficient to suppress breakage of the hydrogel 102 during the drying step.

If the gelatinization time is too short, e.g. less than 0.5 hour, the hydrogel 102 will shrink during the drying step.

If the gelatinization time is longer than 72 hours, there is a risk that the hydrogel 102 may be dried, and, consequently, the structure may be destroyed.

<Integration With Fibers>

In order to cause the sol 101 to soak into fibers of an unwoven fabric or glass wools and to convert it to a gel, preferably, a sol 101 that has been adjusted to a predetermined pH may preliminarily be coated onto the fibers by use of a dispenser or the like, and then, the sol 101 may be converted into a gel.

In that case, when the gel is compounded with an unwoven fabric, the unit weight of the unwoven fabric is preferably 0.5 g/m$^2$ or less, more preferably 0.25 g/m$^2$ or less. When these conditions are adopted, solid heat conduction through the unwoven fabric can be tolerable, and the resulting material will serve as an excellent heat-insulation material. If the unit weight is 0.05 g/m$^2$ or less, any effects to improve the strength cannot be expected. Therefore, the unit weight may be larger than 0.05 g/m$^2$.

For an even industrial purpose, in terms of sufficient pot life of the sol 101, the following way is preferable in order to cause a desired gelatinization reaction. That is, a preparation of a sol 101 in which twice the required amount of the acid is included, and a preparation of a sol 101 not including any acids are provided. Preferably, these preparations are discharged separately from respective tanks, and then, are mixed together and coated directly onto the unwoven fabrics or glass wools.

(2) Aging Step

An aging temperature is preferably from 50° C. to 100° C. in case of ordinary pressure.

If the aging temperature is below 50° C., required heat will not be transmitted to the hydrogel 102 in the same manner as the gelatinization step, and growth of silica particles will not be promoted. Accordingly, it takes some time before the aging process sufficiently proceeds. Furthermore, the produced hydrogel 103 with a reinforced strength may have low strength, and may excessively be shrunk during the drying step. As a result, a desired aerogel 105 cannot be obtained.

In cases where the aging temperature exceeds 100° C., a phenomenon in which water is volatilized and separated from the hydrogel 102 inside the vessel would be observed even if the vessel is sealed. This phenomenon causes reductions in the volume of the resulting hydrogel 103 with a reinforced skeleton, and thus, there may be cases where a desired aerogel 105 cannot be obtained.

A time for aging (aging time) depends on the aging temperature. However, the aging time is preferably from 0.5 to 24 hours in terms of sufficient productivity and properties.

If the aging time is less than 0.5 hour, improvements in strength of gel walls of the hydrogel 103 with a reinforced skeleton may be insufficient.

If the aging time exceeds 24 hours, effects of aging on improvements in strength of gel walls of the hydrogel 103 with a reinforced skeleton may be poor, and, contrarily, even productivity may be impaired.

In order to increase the pore volume and/or the mean pore diameter of the aerogel 105, the gelatinization temperature and the aging temperature are preferably increased within the above-mentioned ranges, and/or that a sum of the gelatinization time and the aging time is preferably increased within the above-mentioned ranges. Furthermore, in order to decrease the pore volume and/or the mean pore diameter of the aerogel 105, the gelatinization temperature and the aging temperature are preferably decreased within the above-mentioned ranges, and/or a sum of the gelatinization time and the aging time is preferably decreased within the above-mentioned ranges.

Additionally, in order to prevent elution of silica, it is effective to carryout aging in the presence of saturated water vapor. Furthermore, it is also effective to carry out aging in a steamed state. For the industrial purpose, it is preferable that aging is carried out in a tank that makes it possible to stably maintain a high-temperature and high-humidity environment, e.g. at 85° C. and at a humidity of 85%. In this embodiment, in order to prevent drying of the outermost surface of the hydrogel 103 with a reinforced skeleton, aging is carried out in a condition in which the surface of the vessel is covered with a film of polypropylene.

(3) Hydrophobization Step

The aged hydrogel 103 having a reinforced skeleton is reacted with a silylating agent to carry out hydrophobization of the gel, thereby manufacturing a surface-modified gel 104.

Figure 2:
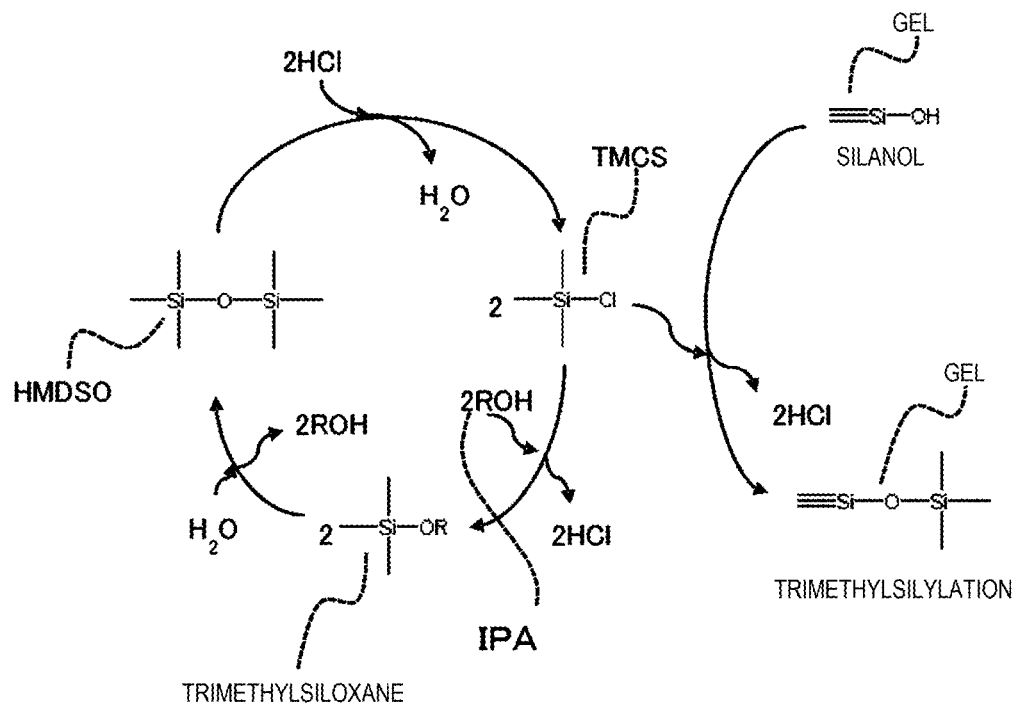
FIG. 2 is a diagram that illustrates a hydrophobization reaction of silanols based on hexamethyldisiloxane (HMDSO).

In this embodiment, in a hydrophobization reaction that is provided for the aerogel 105 and in the method for manufacturing an aerogel 105, for example, hexamethyldisiloxane (hereinafter, referred to as HMDSO) is used as shown in FIG. 2. A trimethylsilylation reaction is carried out with respect to silanols in the hydrogel 103 with a reinforced skeleton, in a mixture solvent of HMDSO, HCl and IPA. An elementary reaction of this hydrophobization will be described with reference to FIG. 2.

At first, one molecule of HMDSO reacts with two molecules of hydrochloric acid, and thus, two molecules of trimethylchlorosilane (TMCS) are produced. The produced TMCS reacts with silanols present on surfaces of silica secondary particles in the hydrogel to form trimethylsiloxane bonds. At that time, hydrochloric acid is produced as a by-product <Concentration>

In the hydrophobization reaction, HCl may be included at a molar ratio of from 0.01 to 2.0 with respect to the amount of HMDSO included therein. In the reaction system, TMCS which severs as an active species can be produced simultaneously.

When the molar ratio of HCl to an amount of HMDSO included in the reaction is between 0.01 and 2.0, an amount of TMCS that is required for hydrophobization can efficiently be produced.

If the molar ratio of HCl to an amount of HMDSO included in the reaction is less than 0.01, an amount of TMCS produced in the reaction may be insufficient. To the contrary, if HMDSO is included in the reaction at a molar ratio of more than 2.0, HCl may be excessive.

In that case, the concentration of the aqueous hydrochloric acid is preferably from 1 N to 12 N, more preferably from 6 N to 12 N.

When the concentration of the aqueous hydrochloric acid is between 6 N and 12 N (normal), a quantity of HCl that will be sufficient for the chemical reaction can be introduced into the reaction solution.

If the concentration of the aqueous hydrochloric acid is less than 1 N, an amount of water that is added to the system will be larger, and therefore, the hydrophobization reaction may not proceed in a preferable manner.

The amount of the silylating agent (HMDSO) added to the reaction is preferably from 100% to 800% with respect to the pore volume of the hydrogel 103 with a reinforced skeleton, in order to cause the hydrophobization to efficiently proceed.

In addition, the amount of the silylating agent (HMDSO) added to the reaction is based on a ratio to the pore volume of the hydrogel 103 with a reinforced skeleton.

<Definition of the Amount>

The pore volume of the hydrogel 103 with a reinforced skeleton refers to a volume obtained by subtracting a volume per unit weight of $SiO_2$ from a volume per unit weight of the first aqueous silicate solution, and is calculated based on the following formulas.

$$\text{Pore volume of the hydrogel 103 with a reinforced skeleton (Volume of water in the gel)} = \text{Volume of the first aqueous silicate solution} - \text{Volume of } SiO_2 \quad (1)$$

$$\text{Volume of the first aqueous silicate solution} = \text{Weight} \times [g] \text{ of the first aqueous silicate solution/Density of the first aqueous silicate solution } (1.1) \text{ [cm}^3\text{/g]} \quad (2)$$

$$\text{Volume of } SiO_2 = \text{(Weight} \times [g] \text{ of the first aqueous silicate solution} \times \text{Silicate concentration)/Density of } SiO_2 \text{ (2.2) [cm}^3\text{/g]} \quad (3)$$

<Concentration of Silylating Agent>

If the amount of the silylating agent added to the reaction solution is smaller than 100%, silanols (Si—OH) present on the surfaces of the hydrogel 103 with a reinforced skeleton and inside the hydrogel 103 may remain unreacted. In that case, silanols come into contact with one another due to capillary force caused by a solvent during the drying step. This may cause a dehydration-condensation reaction, and may lead to contraction and densification of the gel.

If the amount of the silylating agent included in the reaction solution is larger than 800%, a large excess of the silylating agent may be present compared to a minimal amount of the silylating agent that should react with silanols. In that case, economic performance and productivity may be deteriorated.

<Silylating Agent>

Other silylating agents that can be used in the disclosure are generally represented by general formula $R^1_3SiCl$ or $R^1_nSi(OR^2)_{4-n}$. In the formula, $R^1$ and $R^2$ are each independently C1-C6 linear alkyls, cyclic alkyls or phenyls. Hexamethyldisilazane (HMDS) is also encompassed by the general formula.

In order to reduce influences by the vaporization in drying the hydrogel 103 with a reinforced skeleton, octamethyltrisiloxane is suitable. For $R^1_3SiCl$, trimethylchlorosilane (TMCS) is preferably used. For $R^1_nSi(OR^2)_{4-n}$ methyltrimethoxysilane (MTMS) is preferably used.

The hydrophobization reaction may be carried out in a solvent, as needed, and, is generally carried out at 10° C. to 100° C., which is considered as a temperature range that makes it possible for the reaction to efficiently proceed while preventing vaporization of the liquid.

If the reaction temperature is less than 10° C., diffusion of the silylating agent may be insufficient, and therefore, the hydrophobization may not sufficiently be achieved.

If the reaction temperature exceeds 100° C., the silylating agent itself may be volatilized, and thus, the silylating agent that is required for the reaction may not be supplied to the outside and the inside of the hydrogel 103 with a reinforced skeleton.

<Solvent>

For the solvent used herein, alcohols such as methanol, ethanol, and 2-propanol; ketones such as acetone, and methylethylketone; and linear aliphatic hydrocarbons such as pentane, hexane, and heptane are preferable. The hydrogel 103 with a reinforced skeleton is solid and hydrophilic, while the silylating agent is liquid and hydrophobic. Therefore, these materials will not be mixed, and the reaction occurs as a solid-liquid heterogeneous system reaction. For this reason, in order to cause the silylating agent, which is an active species, to efficiently react with the hydrogel 103 having a reinforced skeleton, alcohols or ketones, which are amphiphilic solvents, are preferably used, and alcohols are more preferably used.

Furthermore, in order to cause the reaction to more efficiently proceed, the aged hydrogel 103 with a reinforced skeleton may be soaked in HCl in advance, and then, may be soaked in a bath filled with a silylating agent such as HMDSO. In this way, silanols in the hydrogel 103 with a reinforced skeleton may be subjected to a trimethylsilylation reaction. In order to enhance penetration of the silylating agent into the hydrogel 103 with a reinforced skeleton, an amphiphilic liquid such as IPA may be added to the reaction mixture, as needed.

(4) Drying Step

In the drying step, the liquid solvent in the surface-modified gel 104 obtained in the former step is volatilized. With regard to a drying technique used therefor, either the supercritical drying method or non-supercritical drying methods (ordinary-pressure drying methods, freeze-drying methods, etc.), which are any known techniques, can be adopted, and the method used herein is not particularly limited.

However, ordinary-pressure drying is preferably used in view of sufficient mass productivity, safeness and economic efficiency. The drying temperature and the drying time are not limited. However, if the gel is drastically heated, bumping of the solvent in the wet gel may occur, possibly causing large cracks in the aerogel 105.

If cracks appear in the aerogel 105, heat transfer may be caused due to convection of the air, and, consequently, heat-insulation properties may be impaired, or the aerogel 105 may be formed into powders, thus significantly impairing easiness in handling, although it depends on sizes of cracks.

Furthermore, if the aerogel 105 is dried in a high-temperature environment, e.g., at 400° C. or higher, the silylating agent, which has maintained hydrophobicity of the aerogel 105, may be released through heat decomposition, and the resulting aerogel 105 may be an aerogel 105 that loses hydrophobicity.

Therefore, in order to suppress occurrence of cracks, in the drying step, the gel is preferably dried at a temperature that is sufficient to volatilize the liquid in the surface-modified gel 104 at ordinary pressures, e.g., at ordinary temperature to 200° C.

If the drying temperature exceed 200° C., in cases where the aerogel is compounded with a resin-made unwoven fabric, the resin may deteriorate, and therefore, such a temperature is not preferable.

With regard to the aerogel 105 obtained in this way according to the present embodiment, the aging time can be shortened, and the productivity is excellent, compared with conventional production methods. Moreover, the aerogel 105 produced in this embodiment has a very large pore volume, i.e., more than 3 cc/g. Furthermore, the aerogel 105 produced in this embodiment has a pore diameter smaller than the mean free path of the air, i.e., from 10 nm to 68 nm. Accordingly, the aerogel 105 produced in this embodiment has excellent heat-insulation performance, and therefore, can preferably be available for use in home electric appliances, automobile parts, the field of architecture, industrial facilities, etc.

EXAMPLES

Hereinafter, the disclosure will be described on the basis of examples. However, the disclosure is not limited to the examples described below. All reactions were carried out under the atmosphere.

<Evaluations>

For analyses and evaluations on fine structures of aerogels 105, the nitrogen adsorption method called BET measurement was used, and a fully-automatic gas adsorption amount measurement apparatus Autosorb-3B (YUASA IONICS CO., LTD.) was used. Based on the BET measurement, values of pore volumes, mean pore diameters, and specific surface areas were obtained. Bulk densities were calculated from the pore volumes based on Formula 1.

$$\text{Bulk density} = 1/(\text{Pore volume} + 1/\text{Real density}) \quad \text{(Formula 1)}$$

In the formula, 2.2 g/cm$^3$, which is a density of SiO$_2$, was used for the real density.

In addition, a porosity was calculated based on Formula 2.

$$\text{Porosity} = [1 - (\text{Bulk density}/\text{Real density})] \times 100 \quad \text{(Formula 2)}$$

In the formula, 2.2 g/cm$^3$, which is a density of SiO$_2$, was used for the real density. For measurement of heat conductivities, a heat flow meter HFM 436 Lamda (NETZSCH GROUP) was used.

Acceptable ranges for results of the BET measurement were 3.04-10 cc/g for the pore volumes, 10-68 nm for the mean pore diameters, 200-450 m$^2$/g for the specific surface areas, 86.9% or higher for the porosities, and 0.096-0.290 g/cm$^3$ for the bulk densities.

If a resulting gel falls within a range in which the porosity is 86.9% or higher and the bulk density is 0.096-0.290 g/cm$^3$, the gel will have high strength and high heat-insulation performance.

Strength and heat-insulation performance are determined almost based on these three parameters, i.e., pore volumes, mean pore diameters, and specific surface areas.

If values obtained by the BET measurement fall within the above range, the gel exhibits excellent heat-insulation performance.

In addition, although there is no relationship between the specific surface areas and the heat-insulation performance, only a smaller amount of a hydrophobizing agent used in the hydrophobization step is required, and the reaction can be completed in a shorter time, when the specific surface area is smaller. Therefore, the above acceptable range therefor was set.

Examples and Comparative Examples

Details on conditions for examples and comparative examples will be described below. Additionally, the results and the conditions are shown in Tables 1 to 4.

The item "HCl" (hydrochloric acid) in "(3) hydrophobization" in the tables refers to molar ratios of HCl (hydrochloric acid) to HMDSO. The item "IPA" (isopropyl alcohol) in "(3) hydrophobization" in the tables refers to molar ratios of IPA (isopropyl alcohol) to HMDSO. Only for EXAMPLE 2, a heat conductivity measurement was carried out.

TABLE 1

| Step | Control items | EXAMPLE 1 | EXAMPLE 2 | EXAMPLE 3 | EXAMPLE 4 |
|---|---|---|---|---|---|
| (1) Sol preparation | Silicate concentration [%] | 15.98 | 15.98 | 15.98 | 15.98 |
|  | HCl concentration [N] | 12 | 12 | 12 | 12 |

TABLE 1-continued

| Step | Control items | EXAMPLE 1 | EXAMPLE 2 | EXAMPLE 3 | EXAMPLE 4 |
|---|---|---|---|---|---|
| (2) Aging | Aging temperature [° C.] | 80 | 80 | 80 | 80 |
| | Aging time [h] | 12 | 94 | 12 | 12 |
| (3) Hydrophobization | HMDSO [%] | 750 | 150 | 150 | 150 |
| | HCl | 2 | 2 | 2 | 0.1 |
| | IPA | 1 | 1 | 1 | 1 |
| | Hydrophobization temperature [° C.] | 55 | 55 | 55 | 55 |
| | Hydrophobization time [h] | 12 | 12 | 12 | 12 |
| (4) Drying | Drying temperature [° C.] | 150 | 150 | 150 | 150 |
| | Drying time [h] | 2 | 2 | 2 | 2 |
| BET measurement | Pore volume [cc/g] | 3.31 | 3.29 | 3.69 | 3.38 |
| | Mean pore diameter [nm] | 38.4 | 41.8 | 42.7 | 39.4 |
| | Specific surface area [m$^2$/g] | 344 | 315 | 346 | 344 |
| | Bulk density [g/cm$^3$] | 0.27 | 0.27 | 0.24 | 0.26 |
| | Porosity [%] | 88 | 87.9 | 89.1 | 88.2 |
| Comprehensive evaluations | | Excellent | Excellent | Excellent | Excellent |

TABLE 2

| Step | Control items | EXAMPLE 5 | EXAMPLE 6 |
|---|---|---|---|
| (1) Sol preparation | Silicate concentration [%] | 15 | 12 |
| | HCl concentration [N] | 4 | 4 |
| (2) Aging | Aging temperature [° C.] | 80 | 80 |
| | Aging time [h] | 12 | 12 |
| (3) Hydrophobization | HMDSO [%] | 150 | 150 |
| | HCl | 2 | 2 |
| | IPA | 1 | 1 |
| | Hydrophobization temperature [° C.] | 55 | 55 |
| | Hydrophobization time [h] | 12 | 12 |
| (4) Drying | Drying temperature [° C.] | 150 | 150 |
| | Drying time [h] | 2 | 2 |
| BET measurement | Pore volume [cc/g] | 3.45 | 3.04 |
| | Mean pore diameter [nm] | 35.3 | 32.2 |
| | Specific surface area [m$^2$/g] | 345 | 378 |
| | Bulk density [g/cm$^3$] | 0.26 | 0.29 |
| | Porosity [%] | 88.4 | 87 |
| Comprehensive evaluations | | Excellent | Excellent |

TABLE 3

| Step | Control items | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|
| (1) Sol preparation | Silicate concentration [%] | 12 | 12 | 12 | 12 | 12 |
| | HCl concentration [N] | 4 | 4 | 4 | 4 | 4 |
| (2) Aging | Aging temperature [° C.] | 50 | 50 | 50 | 50 | 50 |
| | Aging time [h] | 12 | 12 | 12 | 12 | 12 |
| (3) Hydrophobization | HMDSO [%] | 150 | 150 | 150 | 100 | 100 |
| | HCl | 2 | 2 | 2 | 2 | 2 |
| | IPA | 1 | 1 | 1 | 1 | 1 |
| | Hydrophobization temperature [° C.] | 55 | 55 | 55 | 55 | 55 |
| | Hydrophobization time [h] | 1 | 3 | 12 | 3 | 12 |
| (4) Drying | Drying temperature [° C.] | 150 | 150 | 150 | 150 | 150 |
| | Drying time [h] | 2 | 2 | 2 | 2 | 2 |
| BET measurement | Pore volume [cc/g] | 0.95 | 1.99 | 1.93 | 1.2 | 1.66 |
| | Mean pore diameter [nm] | 9.1 | 13.1 | 11.5 | 6.2 | 11.5 |
| | Specific surface area [m$^2$/g] | 437 | 393 | 387 | 478 | 406 |
| | Bulk density [g/cm$^3$] | 0.71 | 0.41 | 0.42 | 0.42 | 0.61 |
| | Porosity [%] | 67.5 | 81.4 | 80.9 | 80.9 | 72.5 |
| Comprehensive evaluations | | Inferior | Inferior | Inferior | Inferior | Inferior |

TABLE 4

| Step | Control items | COMPARATIVE EXAMPLE 6 | COMPARATIVE EXAMPLE 7 | COMPARATIVE EXAMPLE 8 | COMPARATIVE EXAMPLE 9 | COMPARATIVE EXAMPLE 10 |
|---|---|---|---|---|---|---|
| (1) Sol preparation | Silicate concentration [%] | 12 | 12 | 15 | 8 | 15 |
| | HCl concentration [N] | 4 | 4 | 4 | 4 | 4 |
| (2) Aging | Aging temperature [° C.] | 80 | 80 | 80 | 50 | 80 |
| | Aging time [h] | 4.5 | 2.5 | 4.5 | 24 | 2.5 |
| (3) Hydrophobization | HMDSO [%] | 150 | 150 | 150 | 600 | 150 |
| | HCl | 2 | 2 | 2 | 2 | 2 |
| | IPA | 1 | 1 | 1 | 1 | 1 |
| | Hydrophobization temperature [° C.] | 55 | 55 | 55 | 55 | 55 |
| | Hydrophobization time [h] | 12 | 12 | 12 | 12 | 12 |
| (4) Drying | Drying temperature [° C.] | 150 | 150 | 150 | 150 | 150 |
| | Drying time [h] | 2 | 2 | 2 | 2 | 2 |
| BET measurement | Pore volume [cc/g] | 2.63 | 2.42 | 2.96 | 3.15 | 3 |
| | Mean pore diameter [nm] | 28.5 | 15.7 | 25 | 7.5 | 19.2 |
| | Specific surface area [m$^2$/g] | 369 | 413 | 345 | 747 | 422 |
| | Bulk density [g/cm$^3$] | 0.32 | 0.35 | 0.29 | 0.28 | 0.29 |
| | Porosity [%] | 85.4 | 84.4 | 86.7 | 87.4 | 86.9 |
| Comprehensive evaluations | | Inferior | Inferior | Inferior | Inferior | Inferior |

Example 1

0.08 g of hydrochloric acid serving as an acid catalyst was added to 5.02 g of an alkaline high-molar-ratio first aqueous silicate solution that had been prepared from an alkaline low-molar-ratio second aqueous silicate solution, the first aqueous silicate solution was then stirred thoroughly, and the pH thereof was adjusted to 7.3. The first aqueous silicate solution included 15.98 wt % of $SiO_2$ and 0.57 wt % of $Na_2O$ manufactured by TOSO SANGYO CO., LTD. The hydrochloric acid was a Shika-special-grade product manufactured by KANTO KAGAKU, and the concentration was 12 N. The sol solution was converted to a gel at room temperature in 5 minutes, and the resulting gel was subjected to aging in a furnace at 80° C. for 12 hours.

Next, 750% (i.e., 31.5 mL; 24.1 g; 148 mmol) of hexamethyldisiloxane (hereinafter, referred to as HMDSO) with respect to 4.2 mL, which corresponded to a pore volume of the hydrogel, and 2 equivalents (296 mmol) of HCl and 1 equivalent (148 mmol) of 2-propanol with respect to HMDSO based on molar ratios were added to the aged gel. Thus, the gel was hydrophobized in a furnace at 55° C. for 12 hours in the same manner. The HMDSO was KF-96L-0.65 cs manufactured by SHIN-ETSU CHEMICAL CO., LTD. A molecular weight thereof is 162.38, a boiling point thereof is 101° C., and a density thereof at 20° C. is 0.764 g/mL.

The reaction solution was separated into two phases (upper layer: HMDSO; and lower layer: aqueous HCl), and the gel sunk in the bottom of the lower layer at an early phase. However, the gel floated to the upper layer after completion of the reaction.

Then, the gel was harvested, and was subjected to heat-drying at 150° C. in the air for 2 hours, thereby obtaining 0.65 g of a colorless and transparent silica aerogel (yield: 81.3%, theoretical yield: 0.80 g).

A mean pore diameter, a specific surface area, a pore volume (bulk density), and a porosity of the obtained aerogel were 38.4 nm, 344 m$^2$/g, 3.31 cc/g (0.266 g/cm$^3$), and 88.0%, respectively. Based on the results of the BET measurement, the aerogel obtained under the above conditions was expected to deliver excellent heat-insulation performance.

EXAMPLES 2-6 and COMPARATIVE EXAMPLES 1-10 were prepared under the conditions shown in Tables 1 to 4 based on the production method in EXAMPLE 1.

(Summary)

Figure 3:
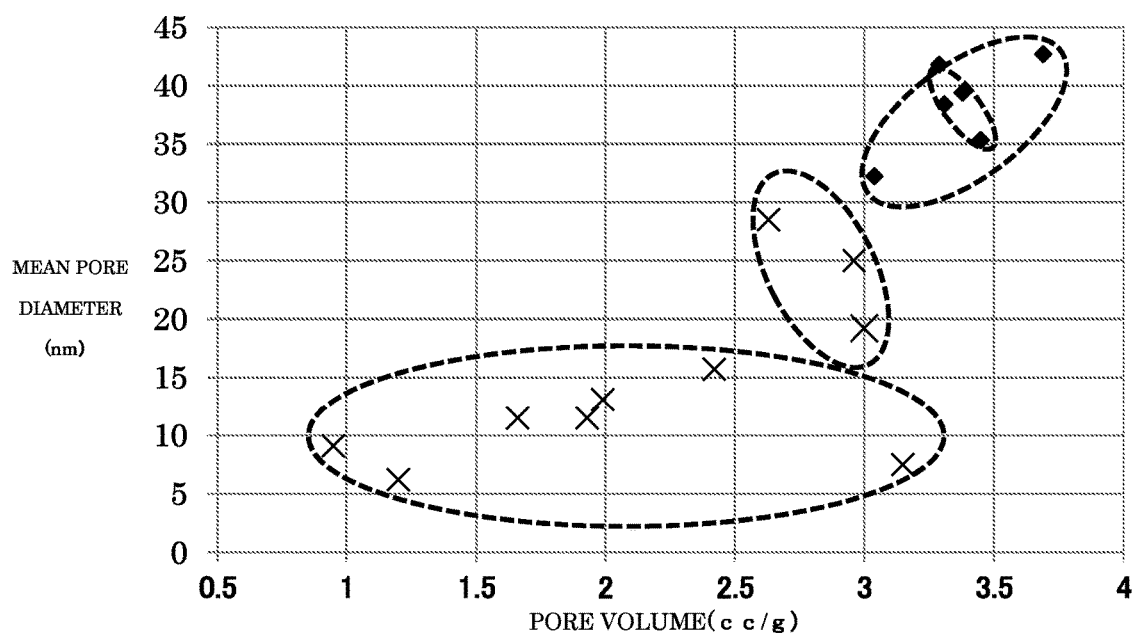
FIG. 3 is a diagram that shows a relationship between pore volumes and mean pore diameters in examples and comparative examples.
Figure 4:
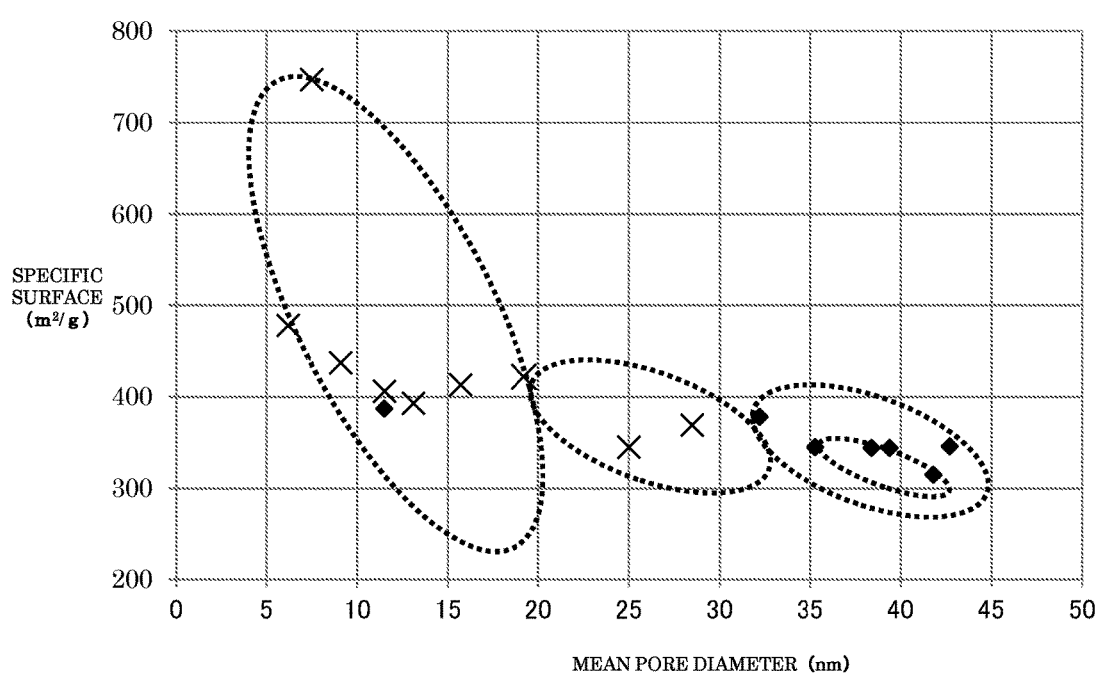
FIG. 4 is a diagram that shows a relationship between specific surface areas and mean pore diameters in examples and comparative examples.
Figure 5:
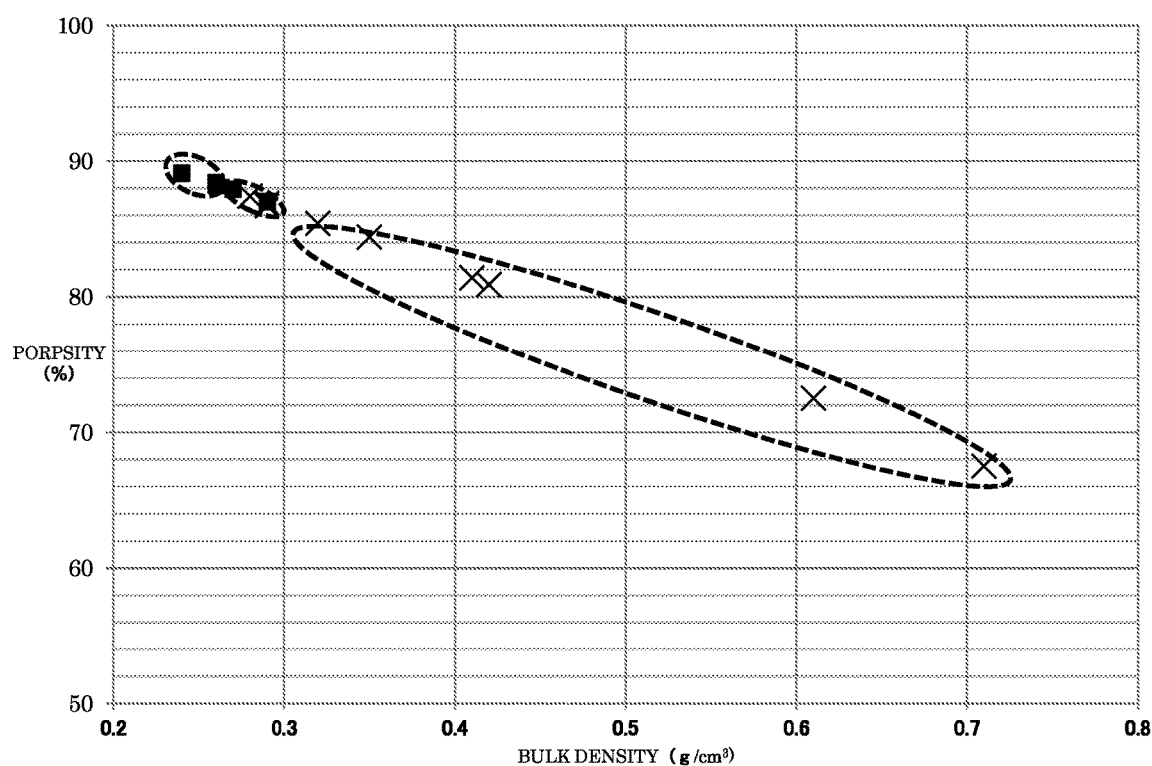
FIG. 5 is a diagram that shows a relationship between bulk densities and porosities in examples and comparative examples.

As shown in FIGS. 3 to 5, performance was compared between the examples and the comparative examples. In the figures, symbols "x" refer to the comparative examples. In the figures, symbols "♦" refer to the examples.

FIG. 3 shows a relationship between pore volumes and mean pore diameters in the examples and comparative examples. Preferably, the pore volume is 3.00 cc/g or more, and the mean pore diameter is 19.2 nm or more.

A region in which the pore volume is from 3.00 cc/g to 3.69 cc/g and the mean pore diameter is from 19.2 nm to 42.7 nm is preferred.

A region in which the pore volume is from 3.00 cc/g to 3.69 cc/g and the mean pore diameter is from 32.2 nm to 42.7 nm is particularly preferable. In this region, variations in the pore volume and the mean pore diameter will be small, and preferable properties will be present.

A region in which the pore volume is from 3.29 cc/g to 3.45 cc/g and the mean pore diameter is from 35.3 nm to 41.8 nm is even more preferable.

FIG. 4 shows a relationship between specific surface areas and mean pore diameters in the examples and comparative examples.

Preferably, the specific surface area is 422 m$^2$/g or smaller, and the mean pore diameter is 19.2 nm or larger.

More preferably, the specific surface area is from 315 m$^2$/g to 422 m$^2$/g, and the mean pore diameter is from 19.2 nm to 42.7 nm.

Even more preferably, the specific surface area is from 315 m$^2$/g to 378 m$^2$/g, and the mean pore diameter is from 32.2 nm to 42.7 nm. In this region, variations in the specific surface areas and the mean pore diameters will be small, and preferable properties will be present.

Still more preferably, the specific surface area is from 315 m$^2$/g to 345 m$^2$/g, and the mean pore diameter is from 35.3 nm to 41.8 nm.

FIG. 5 shows a relationship between bulk densities and porosities in the examples and comparative examples.

Preferable ranges for pore volumes, mean pore diameters, and specific surface areas are summarized as follows. An aerogel that has a pore volumes of from 3.00 cc/g to 10 cc/g, a mean pore diameter of from 19.2 nm to 68 nm, and a specific surface area of from 200 m$^2$/g to 422 m$^2$/g is preferable.

Moreover, an aerogel that has a pore volumes of from 3.00 cc/g to 3.69 cc/g, a mean pore diameter of from 19.2 nm to 42.7 nm, and a specific surface area of from 315 m$^2$/g to 422 m$^2$/g is more preferable.

In particular, an aerogel that has a pore volumes of from 3.00 cc/g to 3.69 cc/g, a mean pore diameter of from 32.2 nm to 42.7 nm, and a specific surface area of from 315 m$^2$/g to 378 m$^2$/g is even more preferable.

Furthermore, an aerogel that has a pore volumes of from 3.29 cc/g to 3.45 cc/g, a mean pore diameter of from 35.3 nm to 41.8 nm, and a specific surface area of from 315 m$^2$/g to 345 m$^2$/g is even more preferable.

Preferably, the bulk density is 0.29 g/cm$^3$ or smaller, and the porosity is 86.9% or higher.

More preferably, the bulk density is from 0.24 g/cm$^3$ to 0.29 g/cm$^3$, and the porosity is from 86.9% to 89.1%.

Particularly preferably, the bulk density is from 0.26 g/cm$^3$ to 0.29 g/cm$^3$, and the porosity is from 87.9% to 89.1%. When the parameters fall within these ranges, variations in the properties will be small.

Furthermore, even more preferably, the bulk density is from 0.26 g/cm$^3$ to 0.27 g/cm$^3$, and the porosity is from 87.9% to 88.4%.

In addition, the heat conductivity measurement was carried out only with respect to Example 2. The heat conductivity was 0.021 W/mK. It was considered that the other examples would have the same level of heat conductivity as Example 2 based on the pore volumes, the mean pore diameters, and the specific surface areas, and would serve as heat-insulation materials.

INDUSTRIAL APPLICABILITY

Silica aerogels according to the disclosure can be used as heat-insulation materials, and the heat insulation materials are preferably available for use in home electric appliances, automobile parts, the field of architecture, industrial facilities, etc.

REFERENCE MARKS IN THE DRAWINGS

101 sol
102 hydrogel
103 hydrogel with a reinforced skeleton
104 surface-modified gel
105 aerogel

The invention claimed is:

1. A silica aerogel having a pore volume of from 3.04 cc/g to 3.69 cc/g, a mean pore diameter of from 32.2 nm to 42.7 nm, and a specific surface area of from 315 m$^2$/g to 378 m$^2$/g.

2. The silica aerogel according to claim 1, having a porosity of from 86.9% to 89.1%, and a bulk density of from 0.24 g/cm$^3$ to 0.29 g/cm$^3$.

3. The silica aerogel according to claim 2, having a porosity of from 87.9% to 89.1%, and a bulk density of from 0.26 g/cm$^3$ to 0.29 g/cm$^3$.

4. The silica aerogel according to claim 1, comprising fibers or an unwoven fabric having a unit weight of 0.5 g/m$^2$ or less.

5. The silica aerogel according to claim 1, comprising fibers or an unwoven fabric having a unit weight of more than 0.05 g/m$^2$ to 0.25 g/m$^2$.

\* \* \* \* \*